Dec. 1, 1964  W. S. EGGERT, JR  3,159,089
VEHICLE ROOF STRUCTURE
Filed Oct. 20, 1961  7 Sheets-Sheet 1
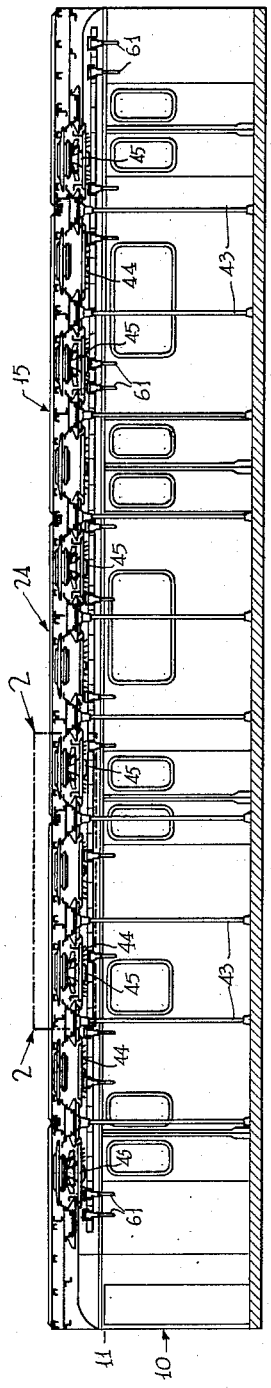
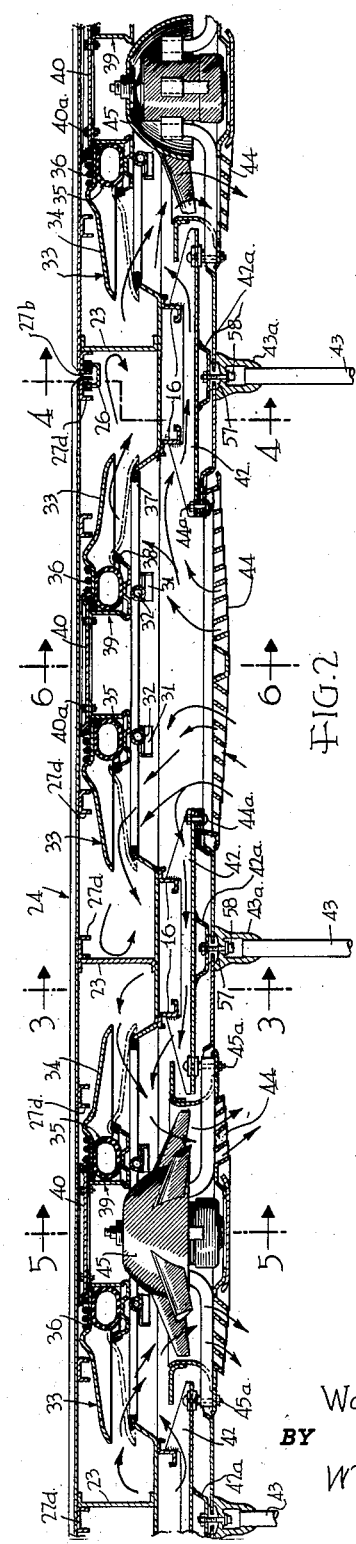
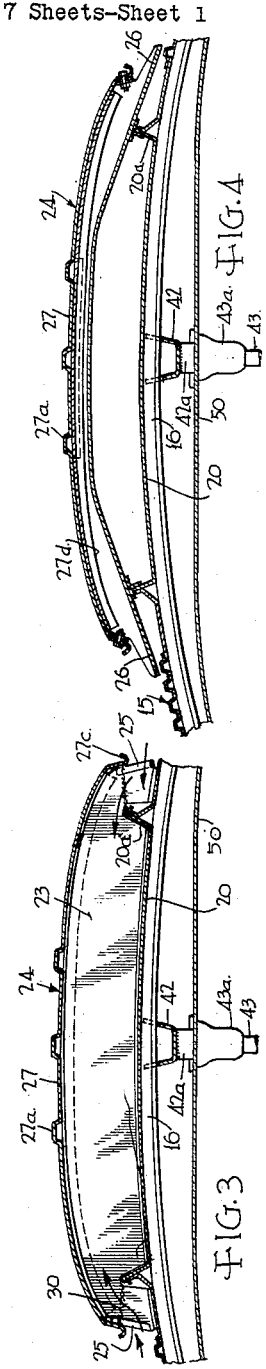
INVENTOR.
Walter S. Eggert, Jr.
BY
Wm. R. Glisson
ATTORNEY

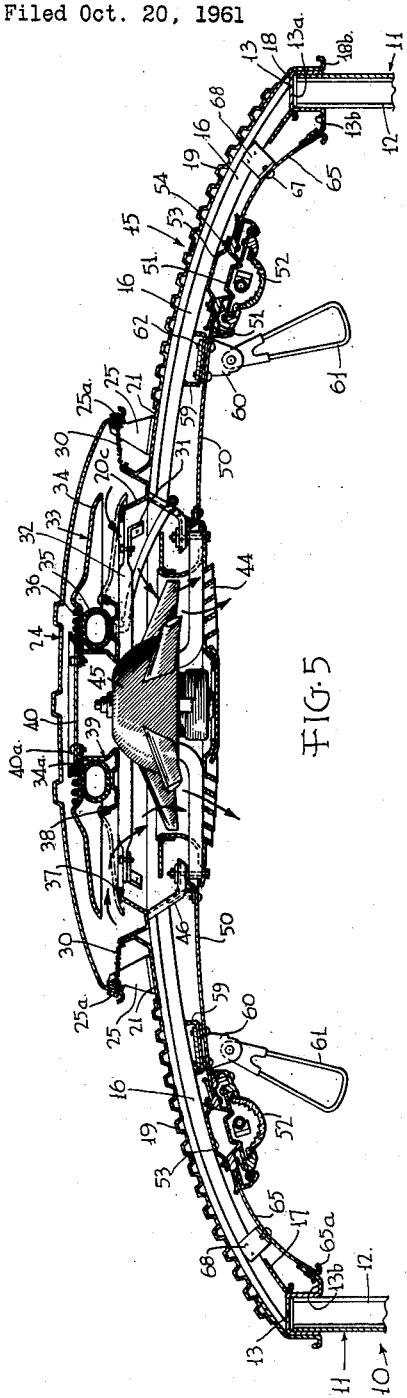

Dec. 1, 1964   W. S. EGGERT, JR   3,159,089
VEHICLE ROOF STRUCTURE
Filed Oct. 20, 1961   7 Sheets-Sheet 3
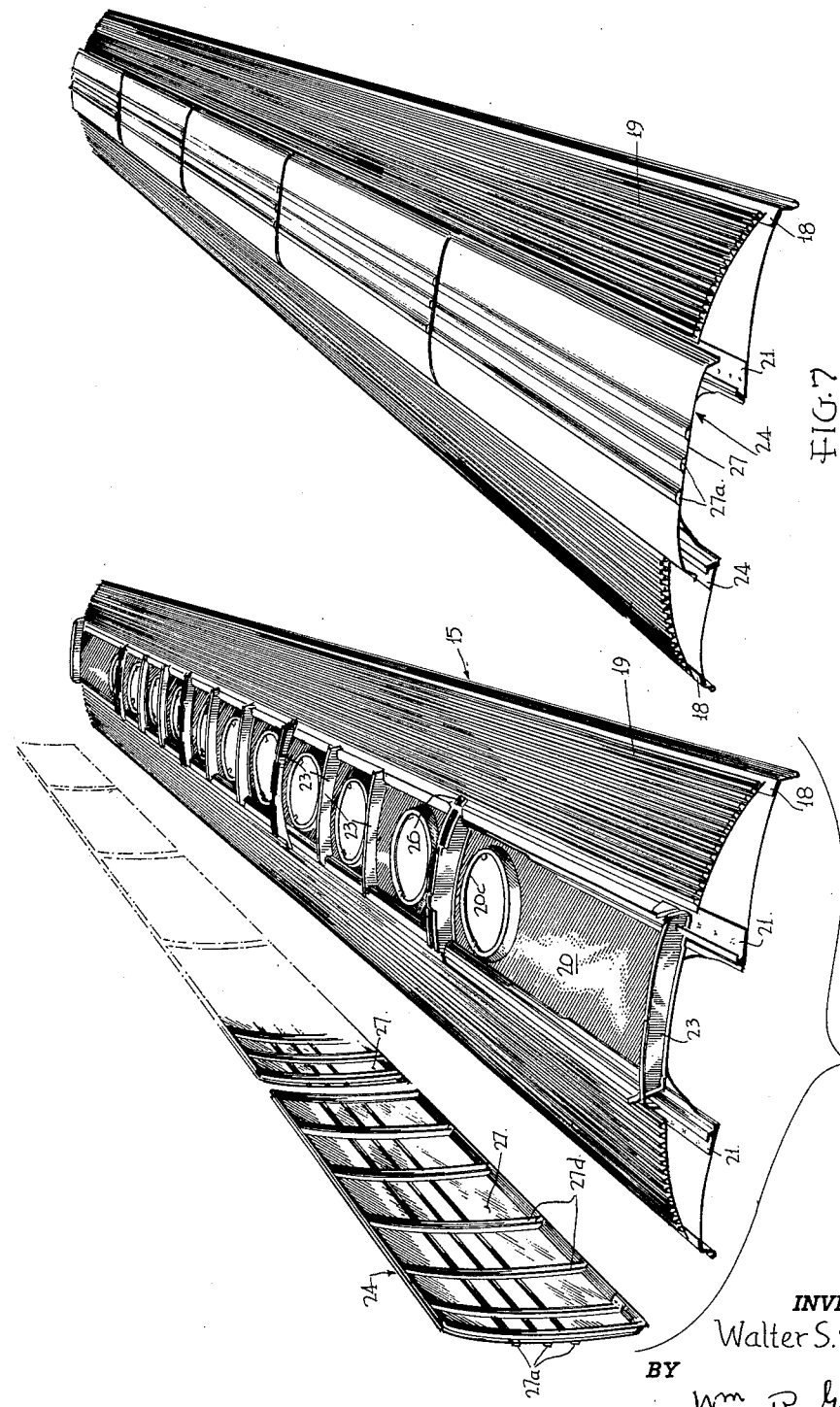
INVENTOR.
Walter S. Eggert, Jr.
BY
Wm. R. Glisson
ATTORNEY Dec. 1, 1964   W. S. EGGERT, JR   3,159,089
VEHICLE ROOF STRUCTURE
Filed Oct. 20, 1961   7 Sheets-Sheet 5

*INVENTOR.*
Walter S. Eggert, Jr.
BY
Wm. R. Glisson
*ATTORNEY*

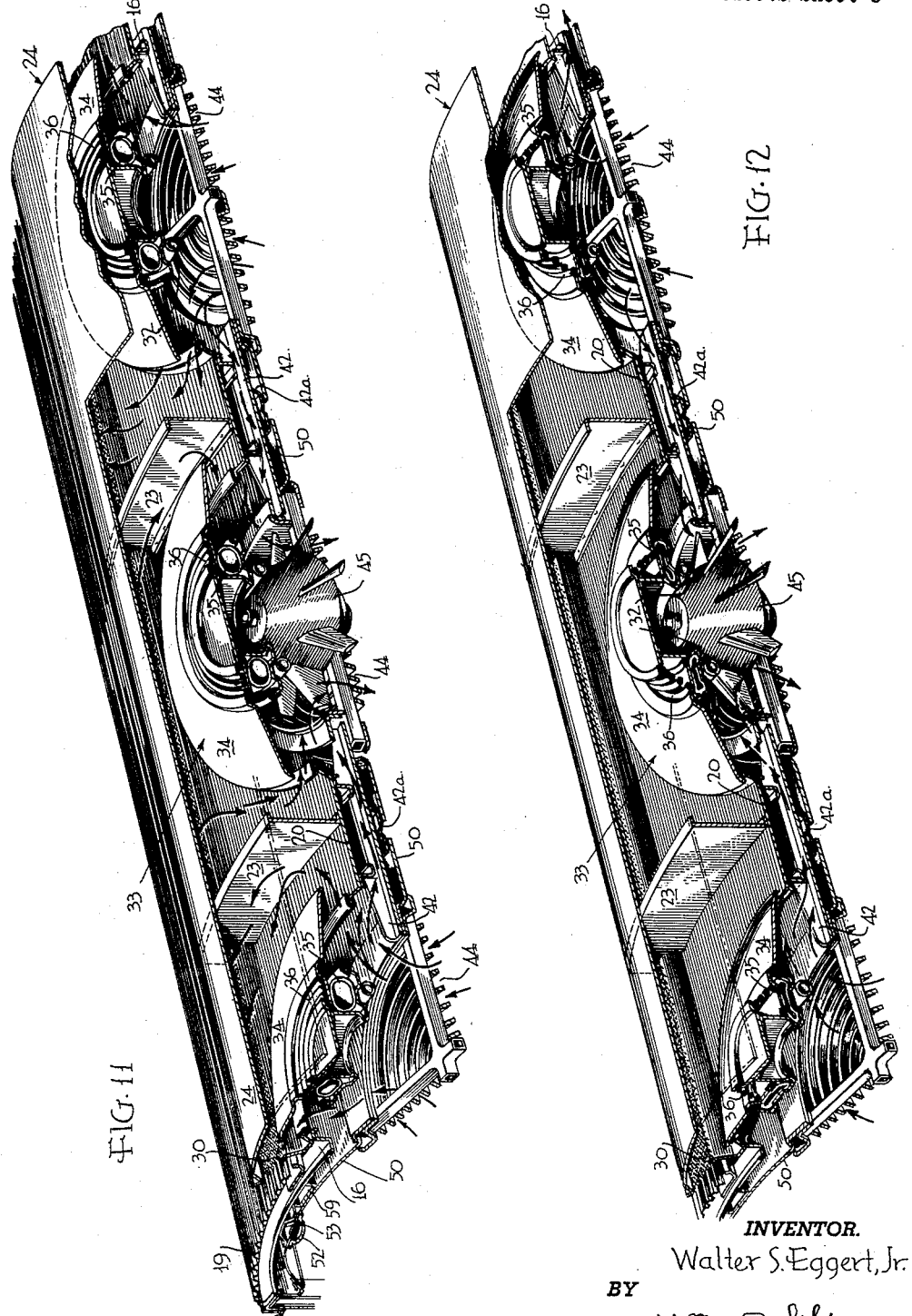

Dec. 1, 1964
W. S. EGGERT, JR
3,159,089
VEHICLE ROOF STRUCTURE
Filed Oct. 20, 1961
7 Sheets-Sheet 7
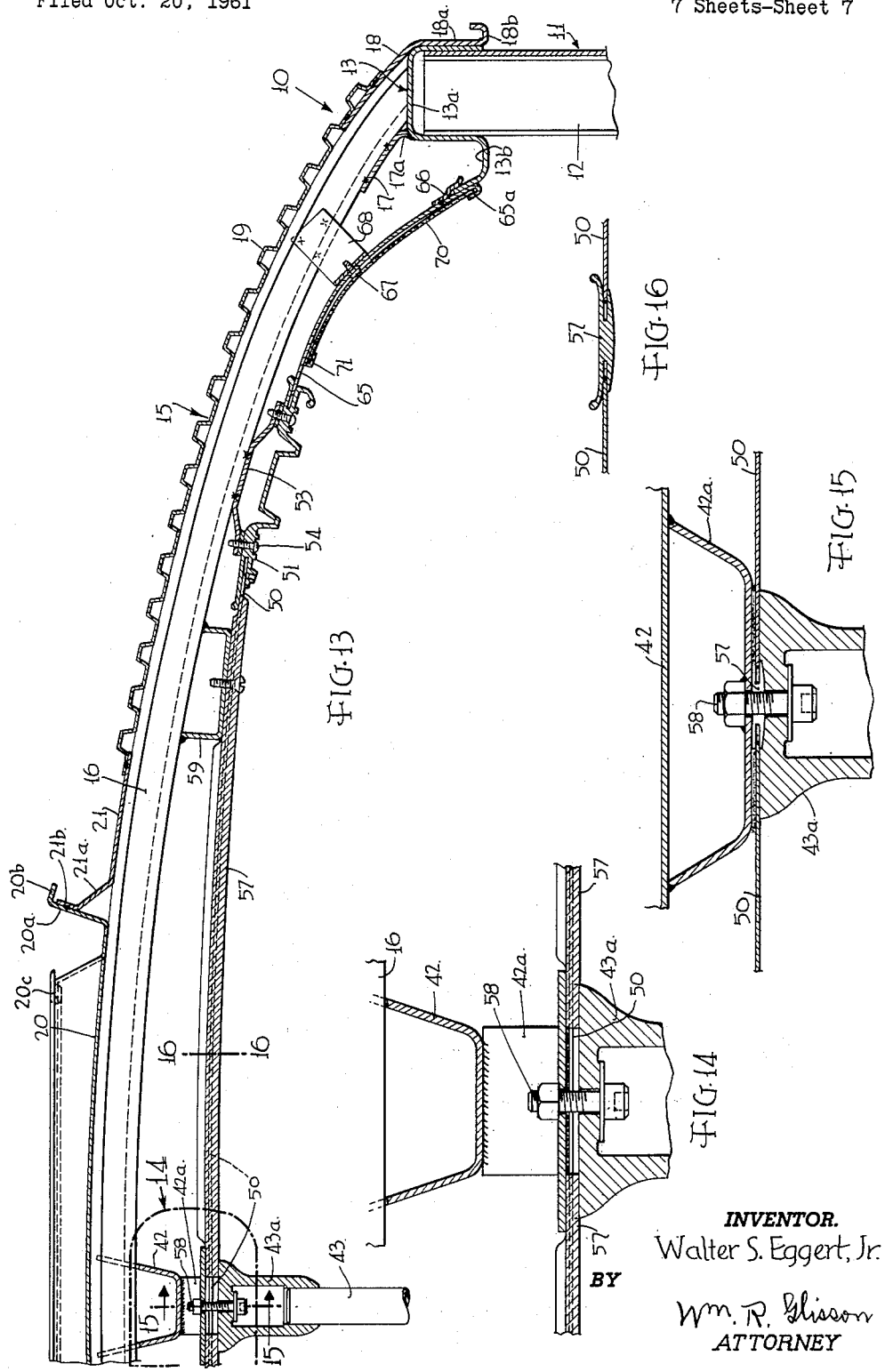
INVENTOR.
Walter S. Eggert, Jr.
BY
Wm. R. Glisson
ATTORNEY

United States Patent Office 3,159,089
Patented Dec. 1, 1964

3,159,089
VEHICLE ROOF STRUCTURE
Walter S. Eggert, Jr., Philadelphia, Pa., assignor to The Budd Company, Philadelphia, Pa., a corporation of Pennsylvania
Filed Oct. 20, 1961, Ser. No. 146,508
4 Claims. (Cl. 98—10)

This invention relates to vehicle roof structure and has for an object the provision of improvements in this art.

One of the particular objects is to provide a roof structure in which the main roof and ceiling are carried by the roof carlines and in which a crown or monitor roof provides plenum space of ample size for fresh ventilating air for the vehicle.

Another object is to provide ample plenum space between the ceiling and main roof for recirculated air, adequate openings being provided for air circulation by ceiling fans.

Another object is to provide a mid-width crown roof which is formed in module sections for a basic ventilating module or unit of the vehicle.

Another object is to provide a crown roof structure which furnishes ample air entry space on the sides and in which the parts are formed for easy air flow and the elimination of moisture and trash.

Another object is to provide a roof structure which allows ready removal of dampers and fans upwardly from the outside when a crown roof section is removed.

Another object is to provide a basic structure with openings and dampers which are all alike and to any one of which a circulating fan can be added.

The above and other objects and advantages of the invention will be apparent from the following description of an exemplary embodiment, reference being made to the accompanying drawings wherein:

FIG. 1 is a central longitudinal vetrical section through a railway car embodying the invention;

FIG. 2 is an enlarged partial central longitudinal section of the upper portion of the car, the view being taken in the zone 2—2 of FIG. 1;

FIG. 3 is a transverse vertical section taken on the line 3—3 of FIG. 2;

FIG. 4 is a transverse vertical section taken on the line 4—4 of FIG. 2;

FIG. 5 is a transverse vertical section taken on the line 5—5 of FIG. 2;

FIG. 6 is a transverse vertical section taken on the line 6—6 of FIG. 2;

FIG. 7 is a perspective view of the top of the roof;

FIG. 8 is a perspective view similar to FIG. 7 but with the monitor roof moved off to one side;

FIG. 11 is a perspective view of a portion of the roof, parts being shown in section, with the dampers in open position;

FIG. 12 is a view like FIG. 11 but showing the dampers in closed position;

FIG. 13 is an enlarged partial transverse section of one section of one side of the roof, with parts omitted, to show the framing and ceiling arrangement;

FIG. 14 is an enlarged partial section of the zone 14—14 of FIG. 13;

FIG. 15 is a vertical transverse section taken on the line 15—15 of FIG. 13; and FIG. 16 is a section taken on the line 16—16 of FIG. 13.

Figure 9:
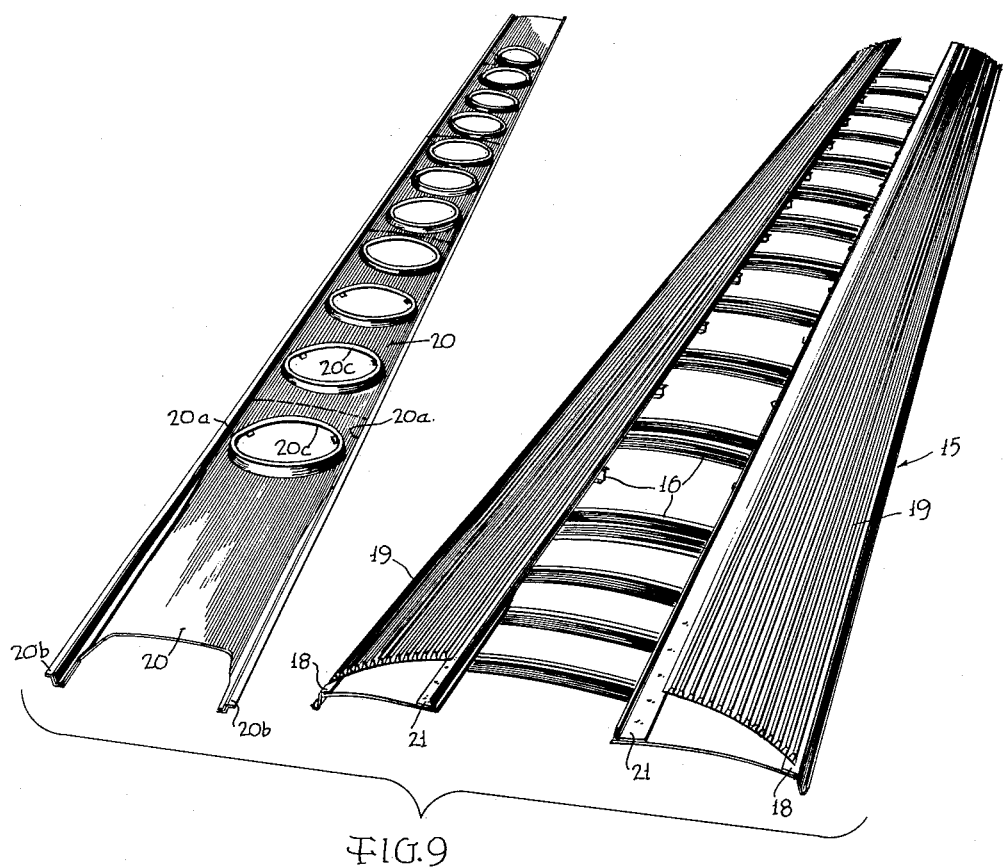
FIG. 9 is a perspective view of the top of the main roof with the monitor roof removed and the middle roof sheet or pan moved off to one side.
Figure 10:
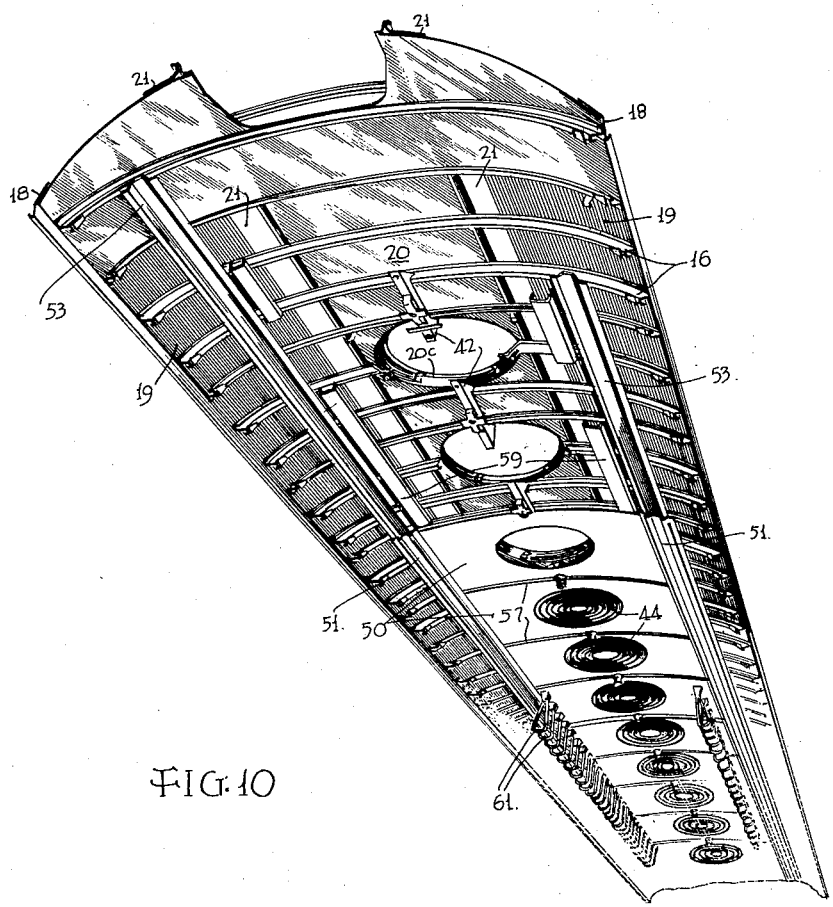
FIG. 10 is a perspective view of the under side of the roof with part of the ceiling covering removed.

As shown in the drawings, a vehicle 10, specifically shown as a railway passenger car of the subway type, has sidewalls 11 each comprising longitudinally spaced posts 12 and a cap plate or purline 13. The purline includes, in section, a downwarldy open channel portion 13a fitting on and welded to the tops of the posts and terminating on the inboard side in an upwardly open valley 13b with the inner flange sloping to fit the contour of the inner ceiling line of the car.

A main roof 15 has carlines 16 which at each end seat on the top of a purline 13, each carline at the lower end having secured thereto, as by welding, a gusset 17 having a downturned lower edge 17a which in final assembly positions against the top inner side of a purline and is secured thereto, as by welding.

On the top at each lower end the carlines have secured thereto, as by welding, a thick through-running eave sheet 18 which on the outside side 18a fits against the outer vertical wall of the purline and is secured thereto in final assembly, as by welding. The lower edge of the eave sheet is turned up to form a gutter 18b.

On each side the carlines carry a through-running main side roof 19, as of a longitudinally corrugated sheet, and at the center for a considerable width carry a through-running middle roof sheet or pan 20. On the sides the roof sheet 20 is bent up to form top purline elements 20a having outwardly extending side flanges 20b to exclude water from air which is drawn in over these edges. At intervals along its length the middle roof sheet 20 is provided with large air passage openings having inwardly and upwardly inclined marginal rim flanges 20c. The roof sheet or pan is preferably formed in sectional lengths which are welded together.

On each side between the side roof 19 and the middle roof sheet 20 there is secured to the carlines an upper side roof sheet 21 which at its inner side is bent to form a sloping portion 21a and an upwardly directed portion 21b which is secured, as by welding, to the side of roof purline 20a. The bent portions 21a and 21b constitute part of the roof purline.

At intervals along the length of the roof between openings there are provided monitor or crown roof spacers 23 which are flanged at the top and bottom edges and are secured, as by welding, to the middle roof sheet 20 and its purline elements 20a. There are spacers 23 on the sides of each opening.

A secondary, monitor or crown roof 24 is mounted above the tops of the transverse spacers 23 and is secured to longitudinally spaced brackets 25 on each side, as by bolts 25a.

The monitor roof 24 (FIG. 1) is made in short sections each covering three roof openings except at the ends where it covers one roof opening and an end space without openings.

A transverse gutter 26 is secured between the ends of each pair of roof sections. It is secured to the purline-like parts 20a and acts as a supplemental monitor carline.

Each section of the monitor roof includes a roof sheet 27 having central longitudinal ribs 27a, downturned end flanges 27b and smooth curved edge gutters 27c. Monitor carlines 27d stiffen and reinforce the monitor roof sections or units and here are of channel shape with the open side facing downwardly. At the ends of the sections of the outer flange of a channel forms the downturned flange 27b overhanging a gutter. Sealing strips 26a are carried by the upper edges of the gutter.

The monitor roof is wider than the space between the composite purlines 20a, 21a etc. and is spaced a considerable distance above these purlines so as to provide a large space for the entry of air on each side. A screen 30 is disposed between the top of a purline 20a and the outer edge of the monitor roof to exclude leaves, paper and other airborne objects. The curved edges of the monitor roof provides a kind of venturi effect for the smooth easy entry of air.

On the outboard sides of each raised hole flange 20c there are provided brackets 31 for mounting longitudinally spaced bars 32, held by bolts 32a, which support a damper unit 33 which forms the subject matter of another application. The damper unit has a plate 34 which is carried by an annular pneumatic operator 35 and a spring 36 for movement between closed and open positions. In closed position the damper plate 34 near its outer edge engages an outer ring seal 37 carried by the edge of the flange 20c and which acts as a water excluder; and near its inner edge engages an inner ring seal 38 carried by a support part 39 which carries the pneumatic operator. The part 39 is secured on the spaced bars 32. The part 39 is annular and has a removable cap 40 secured by bolts 40a to retain the spring. The support part 39 has a base portion 39a and a tubular portion 39b. The base portion is recessed to carry the pneumatic operator 35 and the outer raised edge of the base portion carries the sealing strip 38 already noted. The tubular portion carries the cap 40, as noted. The damper plate 34 has an annular valley near the inner edge to carry the spring 36 and on its inner edge carries an anti-friction band or liner 34a, as of Teflon, Nylon, or the like, to cooperate in a loose fit with the outer side of the tubular portion 39b. When the cap 40 is removed the pneumatic operator 35 and spring 36 can be removed, the monitor roof section being first removed. The bars 32 are shorter than the diameter of the opening so when they are unbolted a whole damper unit can be removed.

Brackets 42 are secured between roof openings to the carlines 16 and their sub-brackets 42a provide support for stanchion posts 43 and part support for louvers 44 or fans 45 or both. Outboard brackets 46 furnish additional support for the fans. Bolts 44a secure the louvers and bolts 45a secure the fans and their louvers. Heater units may be mounted here if desired.

There is a damper and louver for every opening and a down-blowing fan in the opening between each two end openings of each group of three openings. When the dampers are closed the fans circulate interior air from the side openings; and when the dampers are open the fans circulate air from the outside and recirculate air from the inside mixed with it.

The louvers 44 are located in openings in a central ceiling sheet 50 which is spaced well below the center portion of the carlines 16 to provide an ample plenum space for recirculated air. The sheets have raised rims around the louvers 44. Their outboard edges are held in slots of longitudinal strengthening purline-like members 51 which also provide bases for lighting fixtures 52. Inverted downwardly flared flanged longitudinal base channel members 53 are secured to the carlines 16 and have the members 51 secured to them, as by screws 54. The space between the members 53 and 51 may be used as a wiring duct.

The slots of the members 51 are made of excess depth so a sheet can be pushed in to clear the outer edge of a slot on the opposite side, then pushed into the slot on the opposite side without removal from the slot of the first side. The rear or upper side wall of the slots extends out further than the front or lower side so as to serve as a guide in the insertion of the ceiling sheet. This assembly may be completed while the top of the car is in upside down position or on edge and the finished top sub-assembly, except for side ceiling sheets shortly to be described, then secured to the side sub-assemblies.

Transverse grooved joint members 57 support the transverse edges of adjacent ceiling sheets, the sheets and members 57 being placed in succession from one end of the car; and the top stanchion supports 43a, when secured by bolts 58, hold the ceiling sheets in place. The stanchion supports are recessed in the middle to span the transverse members 57.

On each side longitudinal members 59 are secured to the carlines 16 and provide anchorages for bases 60 of hand supports 61, screws 62 securing the bases to tapped anchors carried by the members 59. The middle ceiling sheets are held beneath the bases 60. The members 59, where used, act as purlines. They are not needed at doorway locations for hand supports but may be used here for additional structural strength and rigidity if desired. That is, these members 59 may run full length without gaps, if desired.

At the outboard sides of the longitudinal members 51 curved ceiling side sheets 65 at one edge are secured in over-depth grooves in the outer sides of the members and at the outer edge are secured by strips 66 to the inner edges of the portions 13b of the purlines 13. Intermediately they are secured, as by screws 67, to brackets 68 secured to the carlines 16. A sheet 65 is installed by pushing its inner edge into the over-depth slot of a member 51 until its strip 66 passes the edge of the part 13b of the purlines; then pushing the sheet down until the edge of the part 13b enters the groove provided between the sheet and its strip 66; and finally securing the sheet by screws 67.

Mounting means for car cards 70 are provided, as by the lower bent edges 65a of the sheets, upper groove strips 71 secured to the sheets, and transverse grooved joint-covering strips, not shown.

FIGS. 11 and 12 illustrate the air circulation paths effected by the described arrangements. As seen in FIG. 11, when the dampers are open there is an inflow of fresh air into the monitor compartments between separators 23 and through the roof openings at the fans with an outflow of vitiated air at the other openings and dampers, some air being recirculated through the lower plenum space above the ceiling sheets to and by the fans.

As seen in FIG. 12, when the dampers are closed air is recirculated through the lower plenum chamber to and by the fans. The lower plenum chamber is open along its length but the air circulated by each fan largely passes through the louver at the fan and the two next adjacent louvers. The upper plenum space is compartmented for the individual dampers so that fresh intake air at the fans and exhaust vitiated air at the adjacent openings are carefully kept separated.

It is thus seen that a strong simple roof structure is provided without longitudinal intercostals between carlines, the roof pan sides and adjacent parts providing upper purlines, the lamp base channels providing lower purlines, and the hand strap anchor beams providing other lower purlines. Between the upper openings, those in the roof pan, the brackets 42 provide longitudinal strength members.

The short removable roof sections provide ready access to the dampers and fans and allow them to be removed when desired.

The transverse gutters at intervals along the length provide good removal of water and also comprise structural strength members of the roof.

The parts are all of such size and form that they can be readily formed and assembled in an economical manner.

While one embodiment of the invention has been described for purposes of illustration it is to be understood that there may be various embodiments and modifications within the general scope of the invention.

What is claimed is:

1. In a roof structure for a railway car, the combination of: a primary roof covering said car and including a plurality of longitudinally-spaced first openings located substantially along the longitudinal centerline of said primary roof; means defining a first plenum space which extends along the car above said primary roof and communicates with said first openings and the exterior of the car, said means including a secondary roof spaced above said primary roof and support means supporting said secondary roof on said primary roof; said support means including a plurality of transverse partitions extending across said upper plenum space between said first openings and dividing said upper plenum space into a plurality of separate compartments each communicating with a different one of said first openings; a ceiling supported beneath said primary roof means and forming therewith a second plenum space below said first plenum space, said ceiling having a plurality of longitudinally-spaced second openings communicating with said lower plenum space and the interior of the car; a plurality of dampers operatively connected for controlling the flow of air through said first openings; and a plurality of fans mounted in certain ones of said second openings for pumping air therethrough, said fans being arranged so that when said dampers are open, fresh air and recirculated air are pumped into the interior of the car and some air is exhausted, and, when said dampers are closed, air is merely recirculated within the car.

2. The combination of claim 1 wherein said secondary roof comprises a plurality of roof sections and means detachably connecting said roof sections whereby said roof sections can be removed upwardly.

3. The combination of claim 2 and including means detachably mounting said dampers whereby said dampers can be removed upwardly upon removal of said roof sections.

4. The combination of claim 3 wherein said certain ones of said second openings are located directly beneath first openings, and said combination further comprises means detachably mounting said fans whereby said fans can be removed upwardly upon removal of said dampers and said roof sections.

References Cited by the Examiner
UNITED STATES PATENTS

| | | | |
|---|---|---|---|
| 2,197,740 | 4/40 | Bergstrom | 98—10 |
| 2,286,252 | 6/42 | Bergstrom | 98—10 |
| 2,404,961 | 7/46 | Hoch | 98—42.1 |
| 2,593,094 | 4/52 | Blue | 98—10 |
| 2,625,890 | 1/53 | Dean | 105—397 |
| 2,923,223 | 2/60 | Fall | 98—10 |

FOREIGN PATENTS 389,230    3/33    Great Britain.

ROBERT A. O'LEARY, *Primary Examiner.*

CHARLES E. O'CONNELL, *Examiner.*